(12) United States Patent
Matsumura et al.

(10) Patent No.: US 7,638,172 B2
(45) Date of Patent: Dec. 29, 2009

(54) NON-CHROMATE AQUEOUS METAL SURFACE TREATING COMPOSITION, SURFACE-TREATED STEEL, PAINTED STEEL, STEEL SURFACE TREATMENT METHOD, AND PAINTED STEEL PREPARING METHOD

(75) Inventors: Kazuyuki Matsumura, Gunma-ken (JP); Mitsuo Asai, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 549 days.

(21) Appl. No.: 11/386,094

(22) Filed: Mar. 22, 2006

(65) Prior Publication Data

US 2006/0233958 A1   Oct. 19, 2006

(51) Int. Cl.
| | | |
|---|---|---|
| C04B 9/02 | (2006.01) | |
| B05D 1/36 | (2006.01) | |
| B32B 15/04 | (2006.01) | |
| B05D 7/00 | (2006.01) | |

(52) U.S. Cl. .................. 427/407.1; 427/402; 428/469; 428/472; 106/14.05

(58) Field of Classification Search ............... 427/407.1
See application file for complete search history.

(56) References Cited

U.S. PATENT DOCUMENTS

| | | | | |
|---|---|---|---|---|
| 5,270,428 A | * | 12/1993 | Castellucci | .................. 528/38 |
| 5,478,655 A | * | 12/1995 | Sabata et al. | ................ 428/469 |
| 5,750,197 A | | 5/1998 | van Ooij et al. | |
| 6,132,808 A | | 10/2000 | Brown et al. | |
| 6,261,638 B1 | | 7/2001 | van Ooij et al. | |
| 6,451,432 B1 | | 9/2002 | Azzopardi et al. | |
| 6,596,835 B1 | * | 7/2003 | Brown et al. | .................. 528/34 |
| 2004/0028829 A1 | | 2/2004 | van Ooij et al. | |
| 2006/0127681 A1 | | 6/2006 | Domes et al. | |
| 2006/0193988 A1 | | 8/2006 | Walter et al. | |

FOREIGN PATENT DOCUMENTS

| | | |
|---|---|---|
| DE | 69911431 T2 | 7/2004 |
| EP | 0902069 A2 | 3/1999 |
| JP | 8-73775 | 3/1996 |
| JP | 10-60315 | 3/1998 |
| WO | WO 2004/076717 A1 | 9/2004 |
| WO | WO 2004/076718 A1 | 9/2004 |

OTHER PUBLICATIONS

English translation of European Search Report of EP06251557 mailed on Jul. 6, 2006.

* cited by examiner

*Primary Examiner*—Michael Barr
*Assistant Examiner*—Ryan Schiro
(74) *Attorney, Agent, or Firm*—Westerman, Hattori, Daniels & Adrian, LLP

(57) ABSTRACT

A non-chromate aqueous metal surface treating composition is provided comprising water and an organosilicon compound obtained through hydrolysis of a mixture of a hydrolyzable silane bearing a nitrogen-containing organic group or a partial hydrolyzate thereof and another hydrolyzable silane or a partial hydrolyzate thereof. The surface treating composition is applied to steel members, giving surface treated steel members having high corrosion resistance and workability. When an overcoat layer is formed thereon, painted steel members of quality are manufactured.

7 Claims, No Drawings

NON-CHROMATE AQUEOUS METAL SURFACE TREATING COMPOSITION, SURFACE-TREATED STEEL, PAINTED STEEL, STEEL SURFACE TREATMENT METHOD, AND PAINTED STEEL PREPARING METHOD

CROSS-REFERENCE TO RELATED APPLICATION

This non-provisional application claims priority under 35 U.S.C. §119(a) on Patent Application No. 2005-083759 filed in Japan on Mar. 23, 2005, the entire contents of which are hereby incorporated by reference.

TECHNICAL FIELD

This invention relates to non-chromate aqueous metal surface treating compositions which are useful for the surface treatment of a variety of steel members. It also relates to steel members surface treated therewith, painted steel members, a method for the surface treatment of steel members, and a method for producing painted steel members. Suitable steel members include cold rolled steel, hot rolled steel, stainless steel, and modified steel members such as zinc electroplated steel, hot dip galvanized steel, zinc-aluminum alloy plated steel, zinc-iron alloy plated steel, zinc-magnesium alloy plated steel, zinc-aluminum-magnesium alloy plated steel, aluminum plated steel, aluminum-silicon alloy plated steel, tin plated steel, lead-tin alloy plated steel, and chromium plated steel

BACKGROUND ART

In the metal surface treatment art, chromium-based surface treating agents for chromate treatment and phosphate/chromate treatment were implemented and are widely utilized even at the present. However, the recent trend of environmental protection suggests an upcoming possibility to ban the chromium-based surface treating agents because of the toxicity and especially carcinogenicity inherent to chromium. There is a desire to have a surface treating agent that is free of chromium and that achieves high levels of metal adhesion and corrosion resistance comparable to chromate treating agents.

JP-A 8-73775 discloses an acidic surface treating agent comprising two distinct silane coupling agents. The acidic surface treating agent of this system, however, lacks corrosion resistance, which precludes the application thereof to metal members where good corrosion resistance and workability are required after the metal surface treatment.

JP-A 10-60315 discloses a surface treating agent for steel members comprising a silane coupling agent having a specific functional group capable of reacting with an aqueous emulsion. The corrosion resistance required in this patent is for relatively mild tests like wet tests. This surface treating agent is incomparably inferior to the rust-preventing agents which must clear stringent corrosion resistance.

There is a desire to have a non-chromate metal surface treating agent which in thin film form develops corrosion resistance and adhesion during working and which is useful as a coating agent for rust prevention.

DISCLOSURE OF THE INVENTION

An object of the invention is to provide a non-chromate aqueous metal surface treating composition which is free of chromium, and which is so advantageously used in the surface treatment of metals, especially metal-coated steel members, that it endows the treated members with excellent workability and corrosion resistance as a pre-treatment prior to paint coating. Another object is to provide steel members surface treated therewith, painted steel members, a method for the surface treatment of steel members, and a method for producing painted steel members.

The inventor has found that a non-chromate aqueous treating composition comprising water and an organosilicon compound obtained by a very simple process, viz. through hydrolysis of a mixture of a hydrolyzable silane bearing a nitrogen-containing organic group having the general formula (1):

$$YR^1{}_mSiR^2{}_{3-m} \quad (1)$$

wherein $R^1$ is a nitrogen-free, substituted or unsubstituted, monovalent hydrocarbon group of 1 to 8 carbon atoms, $R^2$ is an alkoxy or acyloxy group of 1 to 4 carbon atoms, Y is a nitrogen-containing organic group, and m is 0 or 1, or a partial hydrolyzate thereof, and a hydrolyzable silane having the general formula (2):

$$R^1{}_nR^3{}_{3-n}Si-(CH_2)_a-SiR^1{}_nR^3{}_{3-n} \quad (2)$$

wherein $R^1$ is as defined above, $R^3$ is an alkoxy or acyloxy group of 1 to 4 carbon atoms, n is 0 or 1, and a is an integer of 1 to 10, or a partial hydrolyzate thereof, in water or in an organic solvent containing an effective amount of water for hydrolysis, can be applied to a metal surface to endow it with excellent corrosion resistance and workability; and that this aqueous treating composition is effective as a surface treating agent for steel members and best suited for the surface treatment of steel members and metal-coated steel members, especially zinc base metal-coated steel members.

By treating a surface of a steel member with the surface treating composition and then forming an overcoat layer on the treated surface by coating, a painted steel member having excellent corrosion resistance and workability can be manufactured.

Accordingly, the invention provides a non-chromate aqueous metal surface treating composition comprising

[I] an organosilicon compound obtained through hydrolysis of (A) 100 parts by weight of a hydrolyzable silane bearing a nitrogen-containing organic group having the general formula (1) or a partial hydrolyzate thereof, and (B) 5 to 200 parts by weight of a hydrolyzable silane having the general formula (2) or a partial hydrolyzate thereof, and

[II] water.

The invention also provides a surface-treated steel member which has been surface treated with the surface treating composition, and a painted steel member comprising the surface-treated steel member and an overcoat layer formed on the treated surface by coating. Also contemplated herein are a method for the surface treatment of a steel member, and a method for preparing a painted steel member.

BENEFITS OF THE INVENTION

When the non-chromate aqueous metal surface treating composition of the invention is used as a rust-preventive treating agent or the like in the surface treatment of steel members, it can endow the steel members with better corrosion resistance and workability than conventional chromate-based rust-preventive treating agents. That is, surface treated steel members having high corrosion resistance and workability are obtained. When an overcoat layer is formed thereon by coating, painted steel members of quality are manufactured. This non-chromate aqueous metal surface treating composition has an additional advantage of shelf stability.

DESCRIPTION OF THE PREFERRED EMBODIMENTS

The non-chromate aqueous metal surface treating composition of the invention comprises an organosilicon compound and water. The organosilicon compound is obtained through hydrolysis of a mixture of (A) a hydrolyzable silane bearing a nitrogen-containing organic group and (B) another hydrolyzable silane.

The hydrolyzable silane bearing a nitrogen-containing organic group (A), which serves to make the system water soluble and to render the system alkaline, has the general formula (1):

$$YR^1_m SiR^2_{3-m} \quad (1)$$

wherein $R^1$ is a nitrogen-free, substituted or unsubstituted, monovalent hydrocarbon group of 1 to 8 carbon atoms, $R^2$ is an alkoxy or acyloxy group of 1 to 4 carbon atoms, Y is a nitrogen-containing organic group, and m is 0 or 1.

More particularly, $R^1$ is selected from nitrogen-free, substituted or unsubstituted, monovalent hydrocarbon groups of 1 to 8 carbon atoms, for example, alkyl groups, alkenyl groups, aryl groups, aralkyl groups, and substituted forms of the foregoing in which some or all of the hydrogen atoms are substituted by halogen atoms or the like, such as halogenated alkyl groups. Illustrative non-limiting examples include —CH₃, —CH₂CH₃, —CH₂CH₂CH₃, —CH(CH₃)₂, —CH₂CH₂CH₂CH₃, —CH(CH₃)CH₂CH₃, —CH₂CH(CH₃)CH₃, —C(CH₃)₃, —C₆H₅, and —C₆H₁₃.

$R^2$ is selected from alkoxy and acyloxy groups of 1 to 4 carbon atoms. Illustrative non-limiting examples include —OCH₃, —OCH₂CH₃, —OCH₂CH₂CH₃, —OCH(CH₃)₂, —OCH₂CH₂CH₂CH₃, —OCH(CH₃)CH₂CH₃, —OCH₂CH(CH₃)CH₃, —OC(CH₃)₃, —OCOCH₃, and —OCOCH₂CH₃, with —OCH₃ and —OC₂H₅ being preferred.

Y is selected from nitrogen-containing organic groups such as groups of the general formula (3):

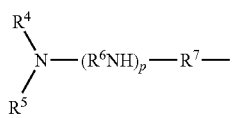

(3)

wherein $R^4$ and $R^5$, which may be the same or different, are selected from hydrogen and monovalent hydrocarbon groups of 1 to 8 carbon atoms, $R^6$ and $R^7$, which may be the same or different, are selected from divalent hydrocarbon groups of 1 to 8 carbon atoms, and p is 0 or an integer of 1 to 3. Examples of the monovalent $C_{1-8}$ hydrocarbon groups represented by $R^4$ and $R^5$ are as exemplified for $R^1$. Examples of the divalent $C_{1-8}$ hydrocarbon groups represented by $R^6$ and $R^7$ include, but are not limited to, alkylene groups such as methylene, ethylene, trimethylene and tetramethylene.

Illustrative non-limiting examples of the nitrogen-containing organic groups represented by Y include H₂NCH₂—, H(CH₃)NCH₂—, H₂NCH₂CH₂—, H(CH₃)NCH₂CH₂—, H₂NCH₂CH₂CH₂—, H(CH₃)NCH₂CH₂CH₂—, (CH₃)₂NCH₂CH₂CH₂—, H₂NCH₂CH₂HNCH₂CH₂CH₂—, H(CH₃)NCH₂CH₂HNCH₂CH₂CH₂—, (CH₃)₂NCH₂CH₂HNCH₂CH₂CH₂—, H₂NCH₂CH₂HNCH₂CH₂HNCH₂CH₂CH₂—, and H(CH₃)NCH₂CH₂HNCH₂CH₂HNCH₂CH₂CH₂—. Of these, H₂NCH₂CH₂HNCH₂CH₂CH₂— is preferred.

Illustrative non-limiting examples of the hydrolyzable silane bearing a nitrogen-containing organic groups, represented by formula (1), are given below.

H₂NCH₂Si(OCH₃)₃,

H₂NCH₂Si (OCH₂CH₃)₃,

H₂NCH₂SiCH₃ (OCH₃)₂,

H₂NCH₂SiCH₃ (OCH₂CH₃)₂,

H₂NCH₂CH₂Si (OCH₃)₃,

H₂NCH₂CH₂Si (OCH₂CH₃)₃,

H₂NCH₂CH₂SiCH₃ (OCH₃)₂,

H₂NCH₂CH₂SiCH₃ (OCH₂CH₃)₂,

H₂NCH₂CH₂CH₂Si (OCH₃)₃,

H₂NCH₂CH₂CH₂Si (OCH₂CH₃)₃,

H₂NCH₂CH₂CH₂SiCH₃ (OCH₃)₂,

H₂NCH₂CH₂CH₂SiCH₃ (OCH₂CH₃)₂,

H(CH₃)NCH₂CH₂CH₂Si(OCH₃)₃,

H(CH₃)NCH₂CH₂CH₂Si (OCH₂CH₃)₃,

H(CH₃)NCH₂CH₂CH₂SiCH₃ (OCH₃)₂,

H(CH₃)NCH₂CH₂CH₂SiCH₃ (OCH₂CH₃)₂, (CH₃)₂NCH₂CH₂CH₂Si (OCH₃)₃, (CH₃)₂NCH₂CH₂CH₂Si (OCH₂CH₃)₃,

H₂NCH₂CH₂HNCH₂CH₂CH₂Si (OCH₃)₃,

H₂NCH₂CH₂HNCH₂CH₂CH₂Si (OCH₂CH₃)₃,

H₂NCH₂CH₂HNCH₂CH₂CH₂SiCH₃ (OCH₃)₂,

H₂NCH₂CH₂HNCH₂CH₂CH₂SiCH₃ (OCH₂CH₃)₂,

H₂NCH₂CH₂HNCH₂CH₂HNCH₂CH₂CH₂Si (OCH₃)₃,

H₂NCH₂CH₂HNCH₂CH₂HNCH₂CH₂CH₂Si (OCH₂CH₃)₃,

H₂NCH₂CH₂HNCH₂CH₂HNCH₂CH₂CH₂SiCH₃ (OCH₃)₂,

H₂NCH₂CH₂HNCH₂CH₂HNCH₂CH₂CH₂SiCH₃ (OCH₂CH₃)₂.

Inter alia, H₂NCH₂CH₂HNCH₂CH₂CH₂Si(OCH₃)₃ and H₂NCH₂CH₂HNCH₂CH₂CH₂Si(OCH₂CH₃)₃ are most preferred.

The hydrolyzable silanes of formula (1) may also be used in the form of partial hydrolyzates thereof. From the hydrolyzable silanes of formula (1) and partial hydrolyzates thereof, any one or more may be selected so as to impart the desired water solubility and alkalinity to the resulting organosilicon compound.

In combination with the hydrolyzable silane of formula (1) and partial hydrolyzate thereof, another hydrolyzable silane (B) is used. It serves to impart a rust preventive effect and has the general formula (2):

$$R^1_n R^3_{3-n} Si\text{—}(CH_2)_a\text{—}SiR^1_n R^3_{3-n} \quad (2)$$

wherein $R^1$ is as defined above, $R^3$ is an alkoxy or acyloxy group of 1 to 4 carbon atoms, n is 0 or 1, and a is an integer of 1 to 10.

More particularly, $R^1$ is as defined for formula (1). Illustrative non-limiting examples include —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)CH_3$, —$C(CH_3)_3$, —$C_6H_5$, and —$C_6H_{13}$.

$R^3$ is selected from alkoxy and acyloxy groups of 1 to 4 carbon atoms. Illustrative non-limiting examples include —$OCH_3$, —$OCH_2CH_3$, —$OCH_2CH_2CH_3$, —$OCH(CH_3)_2$, —$OCH_2CH_2CH_2CH_3$, —$OCH(CH_3)CH_2CH_3$, —$OCH_2CH(CH_3)CH_3$, —$OC(CH_3)_3$, —$OCOCH_3$, and —$OCOCH_2CH_3$, with —$OCH_3$ and —$OC_2H_5$ being preferred.

The subscript n is 0 or 1, and a is an integer of 1 to 10.

Illustrative non-limiting examples of the hydrolyzable silane of formula (2) are given below.

$(H_3CO)_3Si(CH_2)_2Si(OCH_3)_3$, $(H_3CO)_2CH_3Si(CH_2)_2SiCH_3(OCH_3)_2$, $(H_3CH_2CO)_3Si(CH_2)_2Si(OCH_2CH_3)_3$, $(H_3CH_2CO)_2CH_3Si(CH_2)_2SiCH_3(OCH_2CH_3)_2$, $(H_3CO)_3Si(CH_2)_3Si(OCH_3)_3$, $(H_3CO)_2CH_3Si(CH_2)_3SiCH_3(OCH_3)_2$, $(H_3CH_2CO)_3Si(CH_2)_3Si(OCH_2CH_3)_3$, $(H_3CH_2CO)_2CH_3Si(CH_2)_3SiCH_3(OCH_2CH_3)_2$, $(H_3CO)_3Si(CH_2)_4Si(OCH_3)_3$, $(H_3CO)_2CH_3Si(CH_2)_4SiCH_3(OCH_3)_2$, $(H_3CH_2CO)_3Si(CH_2)_4Si(OCH_2CH_3)_3$, $(H_3CH_2CO)_2CH_3Si(CH_2)_4SiCH_3(OCH_2CH_3)_2$, $(H_3CO)_3Si(CH_2)_6Si(OCH_3)_3$, $(H_3CO)_2CH_3Si(CH_2)_6SiCH_3(OCH_3)_2$, $(H_3CH_2CO)_3Si(CH_2)_6Si(OCH_2CH_3)_3$, $(H_3CH_2CO)_2CH_3Si(CH_2)_6SiCH_3(OCH_2CH_3)_2$, $(H_3CO)_3Si(CH_2)_8Si(OCH_3)_3$, $(H_3CO)_2CH_3Si(CH_2)_8SiCH_3(OCH_3)_2$, $(H_3CH_2CO)_3Si(CH_2)_8Si(OCH_2CH_3)_3$, $(H_3CH_2CO)_2CH_3Si(CH_2)_8SiCH_3(OCH_2CH_3)_2$, $(H_3CO)_3Si(CH_2)_{10}Si(OCH_3)_3$, $(H_3CO)_2CH_3Si(CH_2)_{10}SiCH_3(OCH_3)_2$, $(H_3CH_2CO)_3Si(CH_2)_{10}Si(OCH_2CH_3)_3$, $(H_3CH_2CO)_2CH_3Si(CH_2)_{10}SiCH_3(OCH_2CH_3)_2$.

Inter alia, $(H_3CO)_3Si(CH_2)_2Si(OCH_3)_3$ and $(H_3CH_2CO)_3Si(CH_2)_2Si(OCH_2CH_3)_3$ are most preferred.

The hydrolyzable silanes of formula (2) may also be used in the form of partial hydrolyzates thereof. The hydrolyzable silanes of formula (2) and partial hydrolyzates thereof may be used alone or in combination of two or more.

In the practice of the invention, components (A) and (B) are mixed such that there are 100 parts by weight of the hydrolyzable silane having a nitrogen-bearing organic group of formula (1) or partial hydrolyzate thereof and 5 to 200 parts by weight, preferably 10 to 150 parts by weight of the hydrolyzable silane of formula (2) or partial hydrolyzate thereof. More than 200 pbw of component (B) may adversely affect the stability of aqueous solution whereas less than 5 pbw of component (B) may lead to insufficient corrosion resistance and adhesion.

When a mixture of the hydrolyzable silanes or partial hydrolyzates thereof as components (A) and (B) is hydrolyzed to form an organosilicon compound according to the invention, water is typically used as the solvent. If desired, any of organic solvents miscible with water such as alcohols, esters, ketones and glycols may be added to water as long as water is present in a sufficient amount for hydrolysis of the hydrolyzable silanes. The amount of the organic solvent added is preferably 1 to 100 parts by weight per 100 parts by weight of water. Too much amounts of the organic solvent may be uneconomical or inconvenient in that it takes a time to remove the organic solvent from the system.

Examples of the organic solvents which can be used herein include alcohols such as methyl alcohol, ethyl alcohol, 1-propyl alcohol and 2-propyl alcohol; esters such as methyl acetate, ethyl acetate, and ethyl acetoacetate; ketones such as acetone and methyl ethyl ketone; and glycols such as glycerin and diethylene glycol.

The total amount of the solvent (water or the total of water and organic solvent) is preferably 400 to 5,000 parts by weight, more preferably 1,000 to 3,000 parts by weight per 100 parts by weight of the source silanes combined (the total weight of hydrolyzable silanes or partial hydrolyzates (A) and (B)). Less than 400 pbw of the solvent may allow the reaction to proceed to a too large extent, resulting in a non-uniform system or less shelf stable liquid. More than 5,000 pbw of the solvent may be uneconomical.

The amount of water in the solvent is preferably such that the molar ratio of water to source silanes is from 5 to 50, especially from 10 to 40. If this molar ratio is less than 5, hydrolysis may proceed with difficulty to completion, adversely affecting the liquid stability. A molar ratio of more than 50 may give an economic disadvantage.

Suitable reaction procedures include (1) dropwise addition of a mixture of silanes (A) and (B) to water or an organic solvent containing at least a hydrolytic amount of water, (2) dropwise addition of water to a mixture of silanes (A) and (B) or a mixture of silanes (A) and (B) in an organic solvent, (3) dropwise addition of the hydrolyzable silane or partial hydrolyzate (B) to water or an organic solvent containing at least a hydrolytic amount of water, followed by dropwise addition of the hydrolyzable silane having a nitrogen-bearing organic group or partial hydrolyzate (A) thereto, and (4) dropwise addition of the hydrolyzable silane having a nitrogen-bearing organic group or partial hydrolyzate (A) to water or an organic solvent containing at least a hydrolytic amount of water, followed by dropwise addition of the hydrolyzable silane or partial hydrolyzate (B) thereto. The reaction procedure (1) is most preferred because the resulting organosilicon compound is stable. As used herein, the "hydrolytic amount" of water means an amount of water necessary to effect hydrolysis.

At the end of reaction, the organosilicon compound is obtained in an aqueous solution form. By further adding water or by removing water as the case may be, the aqueous solution of organosilicon compound is preferably adjusted such that 10 to 2,000 parts by weight, more preferably 10 to 1,000 parts by weight of water is present per 100 parts by weight of the organosilicon compound. With less than 10 pbw of water, the organosilicon compound itself may become less shelf stable. Inclusion of more than 2,000 pbw of water may require a more amount of the organosilicon compound aqueous solution to be added in order to impart an effective amount of the organosilicon compound, which is undesirable in cost.

The organosilicon compound thus obtained remains fully shelf stable in an aqueous solution and can be used as an aqueous metal surface treating agent.

The metal surface treating composition of the invention essentially contains the organosilicon compound and water while any optional components may be compounded if desired. Suitable optional components include tannic acid or salts thereof, phytic acid or salts thereof, and aqueous resins such as, for example, urethane resins, epoxy resins, ethylene-acrylic copolymers, phenolic resins, polyester resins, polyolefin resins, alkyd resins, and polycarbonate resins. These aqueous resins may be used alone or in admixture of two or more or even in a copolymerized form. When the aqueous resin is compounded, an organic solvent may be used together to improve the film-forming ability of the resin in order to form a more uniform smooth coating film. There may also be compounded leveling agents, wettability improvers and antifoaming agents. These optional compounds may be used in ordinary amounts as long as they do not interfere with the advantages of the invention.

The surface treating compositions of the invention are useful for the surface treatment of a variety of steel members including cold rolled steel, hot rolled steel, stainless steel, and metal-coated steel members such as zinc electroplated steel, hot dip galvanized steel, zinc-aluminum alloy plated steel, zinc-iron alloy plated steel, zinc-magnesium alloy plated steel, zinc-aluminum-magnesium alloy plated steel, aluminum plated steel, aluminum-silicon alloy plated steel, tin plated steel, lead-tin alloy plated steel, chromium plated steel, and nickel plated steel. In particular, the surface treating compositions of the invention are more effective when applied to metal-coated steel members and especially zinc base metal-coated steel members.

How to use the surface treating composition of the invention is not critical. In one embodiment of the surface treating method, the surface treating composition is applied to a member, after which it is dried. In another embodiment, a member is preheated and the surface treating composition is then applied to the member whereupon the composition is dried by the heat inertia.

In the surface treating method, the surface treating composition of the invention is applied in a coating weight of at least 0.1 mg/m$^2$. A coating weight of less than 0.1 mg/m$^2$ may provide poor rust prevention. Too much buildups may be uneconomical as the pretreating agent prior to paint coating. The preferred coating weight is 0.5 to 5,000 mg/m$^2$, and more preferably 1 to 2,500 mg/m$^2$.

In the surface treating method, the metal surface treating composition may be applied by any desired one of commonly used techniques such as roll coating, shower coating, spraying, dipping and brush coating. The steel members to be treated include the above-mentioned steel members, specifically metal-coated steel members, with best results being obtained from the treatment of various plated steel members.

Independent of a particular coating technique used, the preferred drying conditions include a temperature of room temperature to about 250° C. and a time of about 2 seconds to about 30 minutes and more preferably a temperature of about 40° C. to about 180° C. and a time of about 5 seconds to about 15 minutes. Temperatures above 250° C. may adversely affect adhesion and corrosion resistance. Drying below room temperature may be time-consuming.

According to the invention, a painted steel member is obtained by coating a surface of a steel member with the surface treating composition, drying the composition coating, then coating and forming an overcoat layer on the treated surface of steel member.

The overcoat layer is formed by a painting system in which a non-chromate primer is coated and dried before a topcoat is coated thereon. Alternatively, a functional coating having an anti-fingerprinting, lubricating or other function is employed. The method of producing a painted steel member is applicable to not only a pre-coat steel member, but also a post-coat steel member, and the painted steel member as used herein includes both. The term "steel member" is used herein to encompass steel strips, plates and articles.

The non-chromate primers used herein include all primer compositions which do not use chromate based rust-preventive pigments. Preferred primers are primers using vanadate based rust-preventive pigments and phosphate based rust-preventive pigments (sometimes referred to as V/P pigmented primers) and primers using calcium silicate based rust-preventive pigments. The primer is preferably coated in such an amount as to give a dry coating thickness of 1 to 20 μm. A primer coating of less than 1 μm may lead to a decline of corrosion resistance whereas more than 20 μm may adversely affect the adhesion during working. The baking or drying conditions for the non-chromate primer include a metal surface temperature of 150 to 250° C. and a time of about 10 seconds to about 5 minutes, for example.

The topcoat used herein is not critical. Any conventional coating topcoats may be used.

The functional coating is not critical. All coatings which are currently applied to chromate based pretreatment coatings can be used.

No particular limit is imposed on the technique of applying the non-chromate primer and topcoat or the functional coating. Use may be made of common coating techniques such as roll coating, shower coating, air spraying, airless spraying, and dipping.

EXAMPLE

Synthesis Examples and Examples are given below for illustrating the present invention although the invention is not limited to these examples.

Synthesis Example 1

Water, 197 g (10.9 moles), was fed to a 500-mL reaction vessel equipped with a stirrer, thermometer and condenser. With stirring, a mixture of 50.0 g (0.225 mole) of $H_2NCH_2CH_2HNCH_2CH_2CH_2Si(OCH_3)_3$ and 30.4 g (0.113 mole) of $(H_3CO)_3Si(CH_2)_2Si(OCH_3)_3$ was added dropwise to the reactor at room temperature over 10 minutes while the internal temperature increased from 25° C. to 50° C. In an oil bath, the reactor was further heated to 60-70° C., at which agitation was continued for one hour. With an ester adapter attached, the reactor was then heated to an internal temperature of 99° C. for removing the methanol by-product, leaving 158 g of organosilicon compound No. 1. The product had a nonvolatile content of 33.1% (as heated at 105° C./3 hours).

Synthesis Example 2

Water, 182 g (10.1 moles), was fed to a 500-mL reaction vessel equipped with a stirrer, thermometer and condenser. With stirring, a mixture of 50.0 g (0.225 mole) of $H_2NCH_2CH_2HNCH_2CH_2CH_2Si(OCH_3)_3$ and 15.2 g (0.056 mole) of $(H_3CO)_3Si(CH_2)_2Si(OCH_3)_3$ was added dropwise to the reactor at room temperature over 10 minutes while the internal temperature increased from 27° C. to 51° C. In an oil bath, the reactor was further heated to 60-70° C., at which agitation was continued for one hour. With an ester adapter attached, the reactor was then heated to an internal temperature of 99° C. for removing the methanol by-product, leaving 170 g of organosilicon compound No. 2. The product had a nonvolatile content of 26.1% (as heated at 105° C./3 hours).

Synthesis Example 3

Water, 197 g (10.9 moles), was fed to a 500-mL reaction vessel equipped with a stirrer, thermometer and condenser. With stirring, a mixture of 50.0 g (0.225 mole) of $H_2NCH_2CH_2HNCH_2CH_2CH_2Si(OCH_3)_3$ and 41.5 g (0.113 mole) of $(H_3CH_2CO)_3Si(CH_2)_2Si(OCH_2CH_3)_3$ was added dropwise to the reactor at room temperature over 10 minutes while the internal temperature increased from 25° C. to 44° C. In an oil bath, the reactor was further heated to 60-70° C., at which agitation was continued for one hour. With an ester adapter attached, the reactor was then heated to an internal temperature of 99° C. for removing the methanol and ethanol by-products, leaving 160 g of organosilicon compound No. 3. The product had a nonvolatile content of 33.0% (as heated at 105° C./3 hours).

Example 1

Organosilicon compound No. 1, obtained in Synthesis Example 1, was diluted with water to a solids content of 20%, which is designated non-chromate aqueous metal surface treating composition No. 1.

A piece (70 mm×150 mm×0.8 mm) of commercially available zinc electroplated steel strip EG-MO (Nippon Test Panel Co., Ltd.) was degreased by spraying a commercially available alkaline degreasing agent Surfcleaner 53S (Nippon Paint Co., Ltd.), holding at 60° C. for 2 minutes, washing with water and drying. Then the non-chromate aqueous metal surface treating composition No. 1 was applied at a coating weight of 1 g/m² by spraying, and baked for drying until the test strip reached an ultimate temperature of 150° C.

The undercoated steel strip (ready for painting), which was prepared by coating the zinc plated steel strip with non-chromate aqueous metal surface treating composition No. 1, was evaluated for primary rust prevention and overcoat adhesion. Separately, non-chromate aqueous metal surface treating composition No. 1 was evaluated for shelf stability. The test methods are described below. The results are shown in Table 1.

Example 2

By following the same procedure as in Example 1 aside from using organosilicon compound No. 2 instead of organosilicon compound No. 1, a non-chromate aqueous metal surface treating composition No. 2 was prepared and an undercoated steel strip prepared therefrom. The undercoated steel strip and non-chromate aqueous metal surface treating composition No. 2 were evaluated as in Example 1. The results are also shown in Table 1.

Example 3

By following the same procedure as in Example 1 aside from using organosilicon compound No. 3 instead of organosilicon compound No. 1, a non-chromate aqueous metal surface treating composition No. 3 was prepared and an undercoated steel strip prepared therefrom. The undercoated steel strip and non-chromate aqueous metal surface treating composition No. 3 were evaluated as in Example 1. The results are also shown in Table 1.

Comparative Example 1

A piece of commercially available zinc electroplated steel strip EG-MO was dipped in a reactive chromating solution Surfzinc 1000 (Nippon Paint Co., Ltd.) at 60° C. for 10 seconds. Subsequent roll squeezing and drying at 70° C. for 20 seconds gave a chromate coating weight of 50 mg/m² after drying. There was obtained an undercoated steel strip (ready for painting). It was evaluated for primary rust prevention and overcoat adhesion as in Example 1. The results are also shown in Table 1.

Comparative Example 2

A piece (70 mm×150 mm×0.8 mm) of commercially available zinc electroplated steel strip EG-MO (Nippon Test Panel Co., Ltd.) was degreased by spraying a commercially available alkaline degreasing agent Surfcleaner 53S (Nippon Paint Co., Ltd.), holding at 60° C. for 2 minutes, washing with water and drying. Without further processing, this steel strip was evaluated for primary rust prevention and overcoat adhesion as the undercoated steel strip was in Example 1. The results are also shown in Table 1.

Comparative Example 3

A surface treating solution was prepared by dissolving 4.4 wt % of γ-glycidoxypropylmethyldimethoxysilane, 4.1 wt % of N-(β-aminoethyl)-γ-aminopropylmethyldimethoxysilane (glycidyl to amino group molar ratio=0.5:1), and 10 wt % of methanol in deionized water and adjusting the pH to 6.0 with $H_2ZrF_6$.

A piece (70 mm×150 mm×0.8 mm) of commercially available zinc electroplated steel strip EG-MO (Nippon Test Panel Co., Ltd.) was degreased by spraying a commercially available alkaline degreasing agent Surfcleaner 53S (Nippon Paint Co., Ltd.), holding at 60° C. for 2 minutes, washing with water and drying. Then the surface treating solution was applied at a coating weight of 1 g/m² by spraying, and baked for drying until the test strip reached an ultimate temperature of 150° C. The undercoated steel strip was evaluated for primary rust prevention and overcoat adhesion as in Example 1. Separately, the non-chromate aqueous metal surface treating solution was evaluated for shelf stability as in Example 1. The results are also shown in Table 1.

Comparative Example 4

A 2-L flask equipped with a stirrer, thermometer, reflux condenser and two dropping funnels was charged with 372 g of deionized water and 20 g of polyoxyethylene octylphenyl ether. With stirring, the contents were heated to 80-85° C. Then a monomer mixture of 376 g of butyl acrylate and 4 g of acrylic acid from one dropping funnel and a polymerization catalyst solution containing 8 g of ammonium persulfate in 220 g of deionized water from the other dropping funnel were concurrently added dropwise over 2 hours. After the completion of dropwise addition, the contents were held at 80-85° C. for 2 hours to drive the reaction to completion. The resulting aqueous resin emulsion was a uniform stable emulsion having a resin concentration of 38.0 wt % and pH 1.5.

To 157.9 g of the aqueous resin emulsion were added 3.0 g of γ-aminopropyltriethoxysilane and 600.0 g of deionized water, followed by stirring. An aqueous solution of 1.70 g of zinc nitrate in 100.0 g of deionized water was added thereto. Additional deionized water was added to a total volume of 1 L, yielding a surface treating composition having a resin solids content of 60 g/L and a zinc ion concentration of 0.6 g/L.

A piece (70 mm×150 mm×0.8 mm) of commercially available zinc electroplated steel strip EG-MO (Nippon Test Panel Co., Ltd.) was degreased by spraying a commercially available alkaline degreasing agent Surfcleaner 53S (Nippon Paint Co., Ltd.), holding at 60° C. for 2 minutes, washing with water and drying. Then the surface treating composition was applied at a coating weight of 1 g/m$^2$ by spraying, and baked for drying until the test strip reached an ultimate temperature of 150° C. The undercoated steel strip (ready for painting) was evaluated for primary rust prevention and overcoat adhesion as in Example 1. Separately, the non-chromate aqueous metal surface treating composition was evaluated for shelf stability as in Example 1. The results are also shown in Table 1.

Tests

In the foregoing Examples and Comparative Examples, the primary rust prevention, overcoat adhesion, and shelf stability were examined and rated by the following test methods and criteria.

Primary Rust Prevention

A salt spray test was carried out by spraying 5% saline solution to a surface of an undercoated sample at 35° C., holding for 120 hours and inspecting zinc white rust on a scale from 1 to 10 points. Evaluation was made on both a flat area and an area drawn to a distance of 7 mm by an Erichsen cup tester. The rating is as follows.

| Point | Remarks |
|---|---|
| 10 | no abnormality |
| 9 | slight zinc white rust |
| 8-6 | between 9 and 5 points |
| 5 | zinc white rust over one-half area |
| 4-2 | between 5 and 1 points |
| 1 | zinc white rust over the entire area |

Overcoat Adhesion (a) Using a bar coater No. 32, an acrylic melamine paint SuperLac 100 (Nippon Paint Co., Ltd.) was coated to the undercoated steel strips in Examples and Comparative Examples, followed by drying at 150° C. for 20 minutes to give a dry film thickness of 20 μm. In this way, overcoated samples for adhesion testing were prepared.

(b) Primary Adhesion Test

Cross-Cut

The overcoated sample was cross-cut at intervals of 1 mm to define 100 sections. Adhesive tape was attached to the cross-cut area and then stripped. The retention of paint film sections upon tape stripping was evaluated on a scale from 0 to 10 points.

Erichsen 7 mm

The overcoated sample was drawn to a distance of 7 mm by an Erichsen cup tester. Adhesive tape was attached to the drawn area and then stripped. The retention of sections upon tape stripping was similarly evaluated.

Cross-Cut+Erichsen 7 mm

An area of the overcoated sample was cross-cut at intervals of 1 mm to define 100 sections and drawn to a distance of 7 mm by an Erichsen cup tester. Adhesive tape was attached to the drawn area and then stripped. The retention of sections upon tape stripping was similarly evaluated.

| Point | Remarks |
|---|---|
| 10 | no stripping |
| 9 | 90% ≦ retention of coat sections < 100% |
| 8 | 80% ≦ retention of coat sections < 90% |
| 7 | 70% ≦ retention of coat sections < 80% |
| 6 | 60% ≦ retention of coat sections < 70% |
| 5 | 50% ≦ retention of coat sections < 60% |
| 4 | 40% ≦ retention of coat sections < 50% |
| 3 | 30% ≦ retention of coat sections < 40% |
| 2 | 20% ≦ retention of coat sections < 30% |
| 1 | 10% ≦ retention of coat sections < 20% |
| 0 | 0% ≦ retention of coat sections < 10% |

(c) Secondary Adhesion Test

The overcoated samples prepared in (a) were immersed in boiling water for 30 minutes before the tests as in the primary adhesion test were carried out.

Shelf Stability

The non-chromate aqueous metal surface treating compositions were held in a thermostat chamber at 40° C. for 3 months, after which they were observed for gelation and precipitation and evaluated according to the following criterion.

OK: no gel or precipitates found
NG: gel or precipitates found

TABLE 1

| | | Primary rust prevention | | Overcoat adhesion test | | | | | | |
|---|---|---|---|---|---|---|---|---|---|---|
| | | | | Primary adhesion test | | | Secondary adhesion test | | | |
| | | Flat area | Er. area | Cross-cut | Er. | Cross-cut + Er. | Cross-cut | Er. | Cross-cut + Er. | Shelf stability |
| Example | 1 | 10 | 10 | 10 | 10 | 10 | 10 | 10 | 10 | OK |
| | 2 | 10 | 10 | 10 | 10 | 10 | 10 | 10 | 10 | OK |
| | 3 | 10 | 10 | 10 | 10 | 10 | 10 | 10 | 10 | OK |
| Comparative Example | 1 | 7 | 4 | 10 | 10 | 10 | 6 | 4 | 2 | OK |
| | 2 | 2 | 2 | 4 | 2 | 2 | 2 | 2 | 2 | — |
| | 3 | 5 | 4 | 8 | 7 | 4 | 6 | 5 | 2 | NG |
| | 4 | 7 | 4 | 9 | 8 | 6 | 7 | 5 | 2 | NG |

* Er.: Erichsen cup drawing

As seen from the data in Table 1, the non-chromate aqueous metal surface treating compositions of the invention, when applied to metal substrates, can impart improved corrosion resistance thereto. They are also improved in overcoat adhesion (or receptivity) and thus enable to produce surface treated steel members and painted steel members having improved corrosion resistance and workability. Additionally, they are fully shelf stable.

Japanese Patent Application No. 2005-083759 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A non-chromate aqueous metal surface treating composition comprising

[I] an organosilicon compound obtained through hydrolysis of a mixture comprising (A) 100 parts by weight of a hydrolyzable silane bearing a nitrogen-containing organic group having the general formula (1):

$$YR^1_m SiR^2_{3-m} \tag{1}$$

wherein $R^1$ is a nitrogen-free, substituted or unsubstituted, monovalent hydrocarbon group of 1 to 8 carbon atoms, $R^2$ is an alkoxy or acyloxy group of 1 to 4 carbon atoms, Y is a nitrogen-containing organic group having the general formula (3):

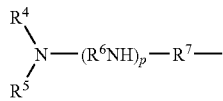
(3)

wherein $R^4$ and $R^5$, which may be the same or different, are selected from hydrogen and monovalent hydrocarbon groups of 1 to 8 carbon atoms, $R^6$ and $R^7$, which may be the same or different, are selected from divalent hydrocarbon groups of 1 to 8 carbon atoms, and p is an integer of 1 to 3, and m is 0 to 1, or a partial hydrolyzate thereof, and (B) 5 to 200 parts by weight of a hydrolyzable silane having the general formula (2):

$$R^1_n R^3_{3-n} Si-(CH_2)_a-SiR^1_n R^3_{3-n} \tag{2}$$

wherein $R^1$ is as defined above, $R^3$ is an alkoxy or acyloxy group of 1 to 4 carbon atoms, n is 0 or 1, and a is an integer of 1 to 10, or a partial hydrolyzate thereof, and

[II] water.

2. The surface treating composition of claim 1 wherein the hydrolyzable silane having formula (1) is $H_2NCH_2CH_2HNCH_2CH_2CH_2Si(OCH_3)_3$ or $H_2NCH_2CH_2HNCH_2CH_2CH_2Si(OCH_2CH_3)_3$.

3. The surface treating composition of claim 1 wherein the hydrolyzable silane having formula (2) is $(H_3CO)_3Si(CH_2)_2Si(OCH_3)_3$ or $(H_3CH_2CO)_3Si(CH_2)_2Si(OCH_2CH_3)_3$.

4. A surface-treated steel member which has been surface treated with the non-chromate aqueous metal surface treating composition of claim 1.

5. A painted steel member comprising the surface-treated steel member of claim 4 and an overcoat layer formed on the treated surface by coating.

6. A method for the surface treatment of a steel member comprising treating a surface of the steel member with the non-chromate aqueous metal surface treating composition of claim 1.

7. A method for preparing a painted steel member comprising treating a surface of a steel member by the method of claim 6 and forming an overcoat layer on the treated surface by coating.

* * * * *